United States Patent
Nanmatsu et al.

(10) Patent No.: US 8,462,300 B2
(45) Date of Patent: Jun. 11, 2013

(54) LIQUID CRYSTAL DISPLAY DEVICE WITH TRIACETYL CELLULOSE FILM AT AN OBSERVER SIDE OF FRONT POLARIZATION PLATE

(75) Inventors: Akihiro Nanmatsu, Osaka (JP); Koki Hongo, Osaka (JP); Takayuki Natsume, Osaka (JP); Ikuji Konishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 297 days.

(21) Appl. No.: 12/934,917

(22) PCT Filed: Feb. 3, 2009

(86) PCT No.: PCT/JP2009/051791
§ 371 (c)(1),
(2), (4) Date: Sep. 27, 2010

(87) PCT Pub. No.: WO2009/139200
PCT Pub. Date: Nov. 19, 2009

(65) Prior Publication Data
US 2011/0025964 A1 Feb. 3, 2011

(30) Foreign Application Priority Data

May 14, 2008 (JP) .................................. 2008-127305

(51) Int. Cl.
*G02F 1/1335* (2006.01)
(52) U.S. Cl.
USPC ........... 349/117; 349/118; 349/119; 349/120; 349/121; 349/96
(58) Field of Classification Search
USPC .......................................... 349/117–121, 96
See application file for complete search history.

(56) References Cited

U.S. PATENT DOCUMENTS

| 4,025,161 | A | 5/1977 | La Roche |
| 5,973,760 | A | 10/1999 | Dohmlow |
| 7,427,371 | B2 * | 9/2008 | Kawanishi et al. ............ 264/2.5 |

(Continued)

FOREIGN PATENT DOCUMENTS

| JP | 56-36406 | 8/1981 |
| JP | 59-189325 | 10/1984 |

(Continued)

OTHER PUBLICATIONS

RU Notice of Allowance and English translation mailed Feb. 20, 2012 in Russian Application 2010144268/28 (063782).

(Continued)

*Primary Examiner* — Hoan C Nguyen
(74) *Attorney, Agent, or Firm* — Nixon & Vanderhye P.C.

(57) ABSTRACT

A liquid crystal display device includes a liquid crystal panel (2) disposed between two linear polarization plates (1, 3) and a triacetyl cellulose film having biaxial optical anisotropy (4), the triacetyl cellulose film having biaxial optical anisotropy (4) (i) being disposed further from the screen front side than a front polarization plate, which is one of the two linear polarization plates (1, 3), and (ii) having a planar retardation comprised in a range from 40 nm to 100 nm. Accordingly, it is possible to provide a liquid crystal display device allowing an observer to perceive, through polarized sunglasses and with a high display quality, an image on a screen not only from a frontal viewpoint but also if an azimuth angle and a polar angle at which viewpoints are set are shifted from the frontal viewpoint.

7 Claims, 7 Drawing Sheets

U.S. PATENT DOCUMENTS

| | | | |
|---|---|---|---|
| 7,511,792 B2* | 3/2009 | Chang et al. | 349/141 |
| 7,548,294 B2* | 6/2009 | Ohmuro et al. | 349/120 |
| 2004/0160559 A1* | 8/2004 | Kim et al. | 349/117 |
| 2007/0012918 A1* | 1/2007 | Lee et al. | 257/59 |
| 2009/0092771 A1* | 4/2009 | Sasata et al. | 428/1.31 |

FOREIGN PATENT DOCUMENTS

| | | |
|---|---|---|
| JP | 3-174512 | 7/1991 |
| JP | 4-305602 A | 10/1992 |
| JP | 6-258633 | 9/1994 |
| JP | 6-258634 | 9/1994 |
| JP | 7-218724 A | 8/1995 |
| JP | 9-325216 A | 12/1997 |
| JP | 10-197858 | 7/1998 |
| JP | 2940031 | 6/1999 |
| JP | 3105374 | 9/2000 |
| JP | 2008-064881 | 3/2008 |
| RU | 2 013 794 C1 | 5/1994 |

OTHER PUBLICATIONS

International Search Report for PCT/JP2009/051791, mailed May 19, 2009.

Japanese Office Action and English translation thereof mailed Aug. 7, 2012 in Japanese Application Tokugan 2010-511904.

* cited by examiner

LIQUID CRYSTAL DISPLAY DEVICE WITH TRIACETYL CELLULOSE FILM AT AN OBSERVER SIDE OF FRONT POLARIZATION PLATE

This application is the U.S. national phase of International Application No. PCT/JP2009/051791 filed 3 Feb. 2009, which designated the U.S. and claims priority to JP Application No. 2008-127305 filed 14 May 2008, the entire contents of each of which are hereby incorporated by reference.

TECHNICAL FIELD

The present invention relates to widening a viewing angle of a liquid crystal display device.

BACKGROUND ART

Liquid crystal display devices have become widely used not only as displays for televisions, computers or portable telephones, but also as in-vehicle displays for car navigation systems or back-seat entertainment devices. Because such liquid crystal display devices output a certain polarized light from inside the device and provide specific polarized light to an observer, when the observer looks at a screen while wearing polarized sunglasses, polarized light from the liquid crystal screen may be shielded by the polarized sunglasses. Depending on the observer's posture, the observer may therefore be unable to observe the screen correctly. Because cases where a passenger in a vehicle wears polarized glasses are relatively numerous, the above problem of lack of visibility of the screen due to polarized glasses, especially regarding in-vehicle displays, has gathered attention.

In this regard, a technology in which a λ/4 plate is disposed toward a panel front side of a front polarization plate of a liquid crystal display device, and linearly polarized light is turned into circularly polarized light and reaches the polarized sunglasses, as disclosed in Patent Literatures 1 to 3, is conventionally adopted.

Figure 5:
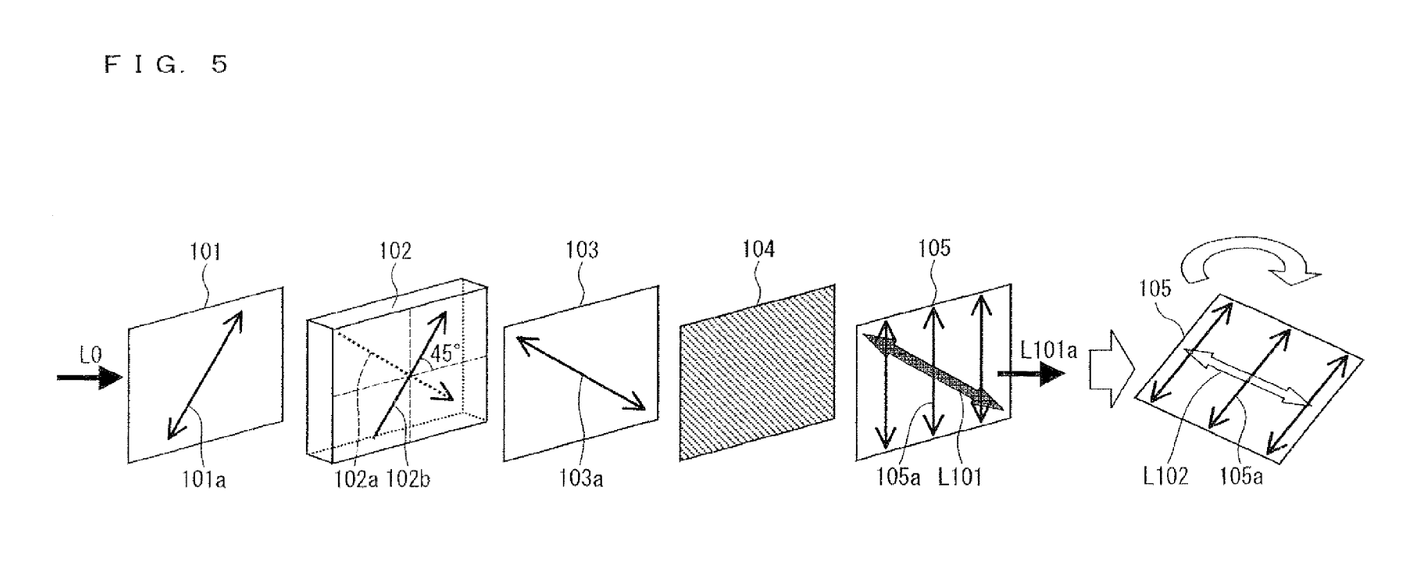
FIG. 5 is an exploded perspective view illustrating a laminated structure of the liquid crystal display device when emitted light is screened by polarizing sunglasses, in accordance with conventional technology.

FIG. 5 illustrates factors causing light from a liquid crystal screen to be blocked by polarized sunglasses.

A backlight light L0 is changed into linearly polarized light by a rear polarization plate 101, and is introduced into a liquid crystal panel 102. The liquid crystal panel 102 typically uses TN liquid crystal cells (twisted nematic liquid crystal cells). Directions of both alignment axes 102a and 102b of liquid crystal particles crossing each other perpendicularly is set in order to have a polarization direction form a 45° angle clockwise with a horizontal line of the screen after optical rotation. Accordingly, a transmission axis 101a of the rear polarization plate 101 crosses perpendicularly the polarization direction after optical rotation. Display light emitted from the liquid crystal panel 102 passes through a front polarization plate 103. A transmission axis 103a of the front polarization plate 103 is parallel to the polarization direction after optical rotation. Light transmitted through the front polarization plate passes through a surface treatment film 104 constituted by a low reflection layer or the like. In this way, light outputted from the liquid crystal screen reaches the polarized sunglasses 105. A transmission axis 105a of the polarized sunglasses 105 is disposed so as to be in a vertical direction when the polarized glasses are worn normally. Thus, among components of reaching light L101 from the liquid crystal screen, a component parallel to the transmission axis 105a is perceived by the observer as transmitted light L101a.

However, in a situation where the observer wearing the polarized sunglasses 105 inclined his/her head to see an image on the liquid crystal screen, the reaching light L102 is screened off by the polarized sunglasses 105 and does not reach the observer if a polarization direction of reaching light L102 toward the polarized sunglasses 105 is perpendicular or substantially perpendicular to a transmission axis 105a. For example, in case of a liquid crystal display device using the TN liquid crystal cells, the transmission axis 105a of the polarized sunglasses 105 is perpendicular to the polarized direction of the reaching light L102 when the observer sees the screen by inclining his/her head to the right at a 45° angle.

Figure 6:
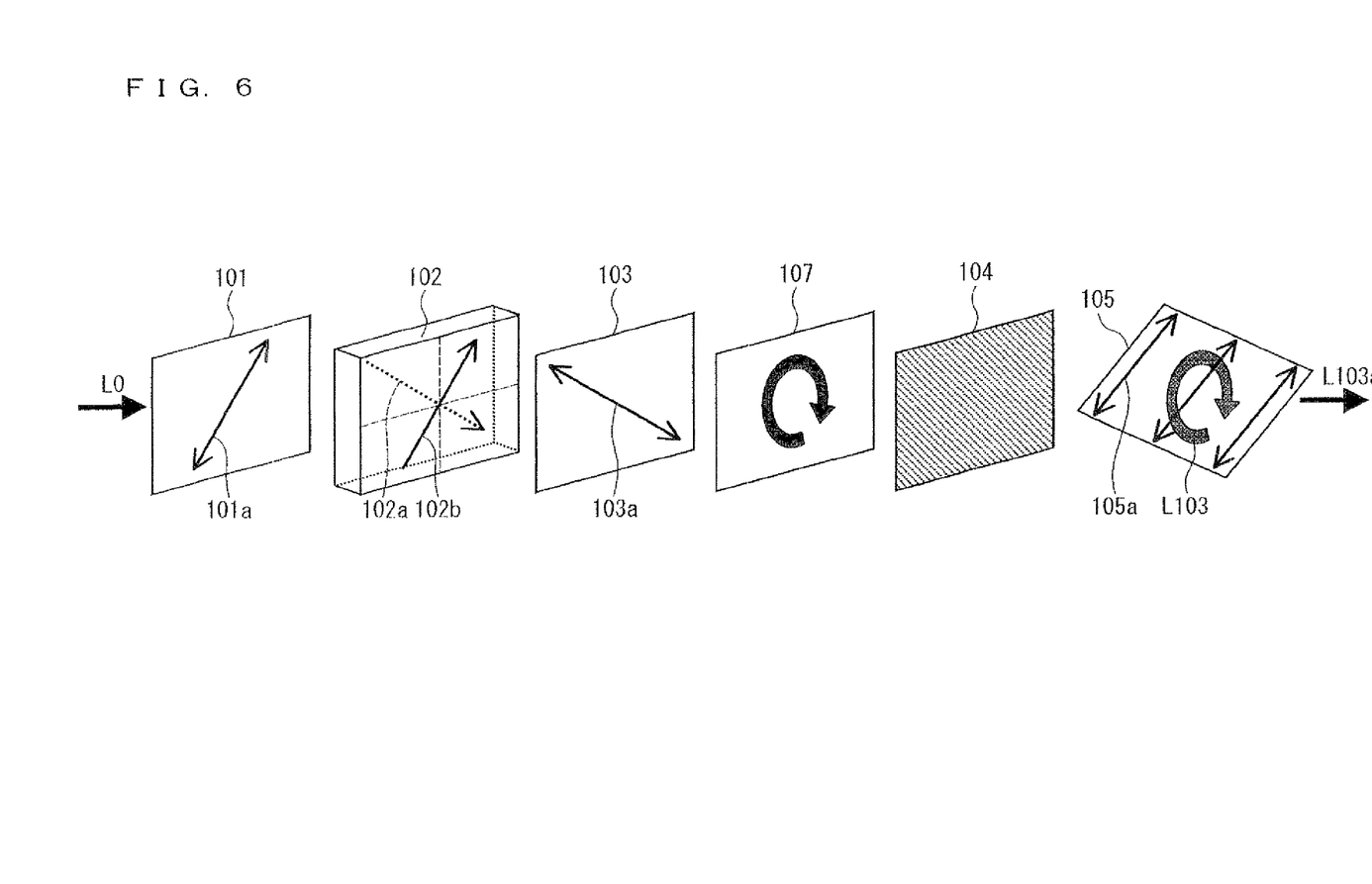
FIG. 6 is an exploded perspective view illustrating a laminated structure of the liquid crystal display device when emitted light is screened by polarizing sunglasses, in accordance with conventional technology.

In contrast, as shown in FIG. 6, when disposing a λ/4 plate 107 on a front side of the front polarization plate 103, straight polarized light transmitted through the rear polarization plate 103 is converted into circularly polarized light. In such a case, because reaching light L103, which reaches to the polarized sunglasses 105, always equally includes a component parallel to the transmission axis 105a of the polarized glasses 105 regardless of whether the observer's head is inclined or not, the reaching light L103 passes through the polarized sunglasses 105 and is perceived by the observer as transmitted light L103a.

CITATION LIST

Patent Literature 1

Japanese Patent Publication, Tokukosho, No. 56-36406 (1981) (Publication Date: Aug. 24, 1981; Japanese Patent Application Publication, Tokukaisho, No. 50-81167 (1975), Publication Date: Jul. 1, 1975)

Patent Literature 2

Japanese Patent Publication of Japanese Patent No. 2940031 (Registration Date: Jun. 18, 1999; Publication Date of the relevant Japanese Patent Application Publication, Tokukaihei, No. 3-174512 (1991): Jul. 29, 1991)

Patent Literature 3

Japanese Patent Publication of Japanese Patent No. 3105374 (Registration Date: Sep. 1, 2000; Publication Date of the relevant Japanese Patent Application Publication, Tokukaihei, No. 6-258634 (1996): Sep. 16, 1994)

SUMMARY OF INVENTION

Figure 7:
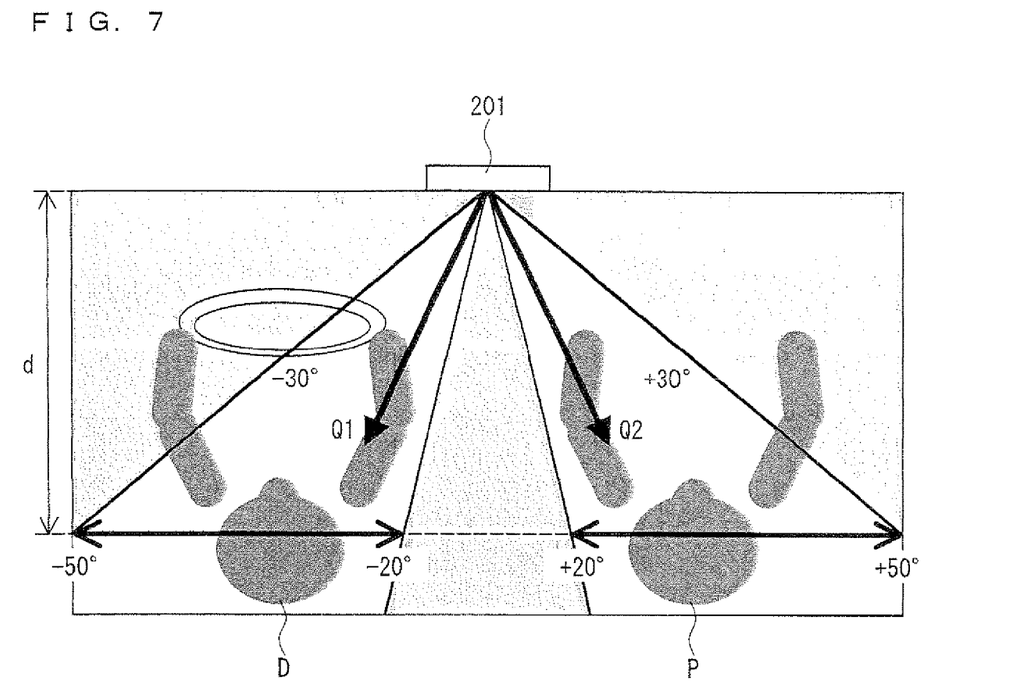
FIG. 7 is an explanatory view regarding viewpoints of the liquid crystal display device.

However, when the liquid crystal display device is used as an in-vehicle apparatus, as shown in FIG. 7, the liquid crystal display device is designed to be viewed, in practical use, in viewing directions extended diagonally upward from a perpendicular direction of the screen of the liquid crystal display device 201 or in viewing directions inclined about 30° horizontally from the perpendicular direction. In FIG. 7, a driver D in a left-hand seat and a passenger P in a right-hand seat are on board. In such a case, a viewing direction of the driver D is designed to be, in practice, at an azimuth angle of −30° within a range from −20° to −50°, diagonally leftward or horizontally leftward with respect to the perpendicular direction of the screen. Further, a viewpoint Q1 is set on the viewing direction of the driver D. Further, a viewing direction of the passenger P is designed to be, in practice, at an azimuth angle of +30° within a range from +20° to +50°, diagonally rightward or horizontally rightward with respect to the perpendicular direction of the screen; in addition, a viewpoint Q1 is set on the viewing direction of the passenger P. The screen and each respective view point of the driver D and of the passenger P are distant from each other by about 700 mm.

Accordingly, in case of installing the conventional liquid crystal display device including the λ/4 plate 107, retardation between orthogonal components of transmitted light is 140 nm (a 90° phase difference at a wavelength of 560 nm) when the liquid crystal display device is viewed from the front. Thus, emitted light reaches the polarized sunglasses 105 as circularly polarized light. However, because transmitted light of the λ/4 plate 107 does not completely become circularly polarized light toward the viewpoints Q1 and Q2, an amount of the transmitted light changes depending on an inclination of a transmission axis 105*a*. As a result, for the viewpoints Q1 and Q2 having an azimuth angle and a polar angle shifted laterally from a frontal viewpoint, the λ/4 plate 107 cannot provide appropriate phase correction even if a birefringent anisotropy of a liquid crystal layer is compensated by a viewing angle widening film and the like. Consequently, such a problem occurs that it is not possible to obtain a satisfactory performance from the liquid crystal display device in terms of display quality for the viewpoints Q1 and Q2.

The present invention is attained in view of the above problems. An object of the present invention is to achieve a liquid crystal display device allowing an observer to perceive, through polarized sunglasses and with a high display quality, an image on a screen not only from a frontal viewpoint but also if an azimuth angle and a polar angle at which viewpoints are set are shifted from the frontal viewpoint.

In order to solve the above problems, a liquid crystal display device in accordance with the present invention includes a liquid crystal panel disposed between two linear polarization plates and a triacetyl cellulose film having biaxial optical anisotropy, the triacetyl cellulose film (i) being disposed closer to a screen front side than a front polarization plate, which is one of the two linear polarization plates, and (ii) having a planar retardation in a range from 40 nm to 100 nm.

With the above invention, a triacetyl cellulose film having biaxial optical anisotropy (i) being disposed closer to a screen front side than a front polarization plate, which is one of said two linear polarization plates and (ii) having a planar retardation comprised in a range from 40 nm to 100 nm is provided. Retardation in the above range is given, in the normal direction to the panel, to light from the liquid crystal panel in transmitting mode which escaped through the front polarization plate. Further, it is possible to give, by three-dimensional refractive anisotropy, retardation of about 140 nm to light outputted at an azimuth angle of 30° and at a polar angle range used as usual viewing range in accordance with the azimuth angle of 30°. Accordingly, when the observer seeks to perceive an image on the present invention from a sideways viewpoint similar to a viewpoint of a car passenger looking at an in-vehicle display, light reaching the observer is substantially circularly polarized light. As a result, even if the observer is wearing polarized sunglasses, reaching light is transmitted through the polarized sunglasses irrespective of an angle of inclination of the observer's head, and the observer thus perceives on a regular basis a display having a stabilized quality.

Further, because observing the panel from the front while inclining one's head is uncommon, an observer wearing polarized sunglasses is unlikely to experience any discomfort caused by perceiving variations in display quality, even if the planar retardation of the triacetyl cellulose film is within the above range.

With the above, it is possible to provide a liquid crystal display device allowing an observer to perceive, through polarized sunglasses and with a high display quality, an image on a screen not only from a frontal viewpoint but also if an azimuth angle and a polar angle at which viewpoints are set are shifted from the frontal viewpoint.

In order to solve the above problems, the liquid crystal display device in accordance with the present invention includes a viewing angle widening film disposed further from the screen front side than the triacetyl cellulose film having the biaxial optical anisotropy.

With the above invention, retardation in the right and left directions of light whose viewing angle has been widened through compensation of retardation and optical activity using the viewing angle widening film is adjusted by the triacetyl cellulose film having biaxial optical anisotropy. Accordingly, it is possible to allow an observer wearing polarized sunglasses to experience without discomfort a widening of the viewing angle of the panel.

In order to solve the above problems, the front polarization plate in the liquid crystal display device in accordance with the present invention is supported between the triacetyl cellulose film having the biaxial optical anisotropy and a protective film.

With the above invention, because the front polarization plate is supported between the triacetyl cellulose film having biaxial optical anisotropy and the protective film, the front polarization plate is supported by two protective films, as in conventional technology. In this way, because it is possible to increase a strength, a resistance to humidity and a resistance to temperature of the front polarization plate, it is possible to give stabilized features to the front polarization plate. Further, it is possible to restrain a number of components included in the protective film.

In order to solve the above problems, the protective film in the liquid crystal display device in accordance with the present invention is a triacetyl cellulose film.

With the above invention, because the protective film, located further from the screen front side, of the front polarization plate is made from two triacetyl cellulose films, combining these two triacetyl cellulose films makes it possible to provide an appropriate protection to the front polarization plate. Further, because the triacetyl cellulose film used as protective film located at the back of the panel for the front polarization plate can be chosen indifferently between a triacetyl cellulose film having optical anisotropy or a triacetyl cellulose film lacking optical anisotropy, it is possible, in line with a necessity to compensate retardation, to give a suitable structure to the protective film of the front polarization plate without having to complexify the laminated structure.

In order to solve the above problems, a surface treatment film is provided on the triacetyl cellulose film having the biaxial optical anisotropy in the liquid crystal display device in accordance with the present invention.

With the above invention, because a surface treatment film is provided on the triacetyl cellulose film having biaxial optical anisotropy, it is possible to suppress light reflectivity.

In order to solve the above problems, a liquid crystal display device in accordance with the present invention includes a liquid crystal panel disposed between two linear polarization plates and a wave plate having uniaxial optical anisotropy, the wave plate (i) being disposed closer to a screen front side than a front polarization plate, which is one of the two linear polarization plates, and (ii) having a thickness retardation comprised in a range from 30 nm to 90 nm.

With the above invention, the liquid crystal display device includes a wave plate having uniaxial optical anisotropy, the wave plate (i) being disposed closer to a screen front side than a front polarization plate, which is one of the two linear polarization plates, and (ii) having a thickness retardation comprised in a range from 30 nm to 90 nm. Retardation of about twice an amount of the retardation in the above range is given, in the normal direction to the panel plane, to light from the liquid crystal panel in transmitting mode which escaped through the front polarization plate. Further, it is possible to give, by dependence on visual direction of optical path length, retardation of about 140 nm to light outputted at an azimuth angle of 30° and at a polar angle range used as usual viewing range in accordance with the azimuth angle of 30°. Accordingly, when the observer seeks to perceive an image on the present invention from a sideways viewpoint similar to a viewpoint of a car passenger looking at an in-vehicle display, light reaching the observer is substantially circularly polarized light. As a result, even if the observer is wearing polarized sunglasses, reaching light is transmitted through the polarized sunglasses irrespective of an angle of inclination of the observer's head, and the observer thus perceives on a regular basis a display having a stabilized quality.

Further, because observing the panel from the front while inclining one's head is uncommon, an observer wearing polarized sunglasses is unlikely to experience any discomfort caused by perceiving variations in display quality, even if the thickness retardation of the triacetyl cellulose film is within the above range.

With the above, it is possible to provide a liquid crystal display device allowing an observer to perceive, through polarized sunglasses and with a high display quality, an image on a screen not only from a frontal viewpoint but also if an azimuth angle and a polar angle set as viewpoint are shifted from the frontal viewpoint.

In order to solve the above problems, the liquid crystal display device in accordance with the present invention includes a viewing angle widening film disposed further to a screen front side than the wave plate.

With the above invention, because a retardation in a longitudinal direction of light whose viewing angle has been widened through compensation of retardation and optical activity using the viewing angle widening film is adjusted by the wave plate having uniaxial optical anisotropy, it is possible to allow an observer wearing polarized sunglasses to experience without discomfort a widening of the viewing angle of the panel.

In order to solve the above problems, the wave plate in the liquid crystal display device in accordance with the present invention is supported between two protective films.

The above invention is structured so that the wave plate is supported between two protective films. In this way, because it is possible to increase a strength, a resistance to humidity and a resistance to temperature of the wave plate, it is possible to give stabilized features to the wave plate.

In order to solve the above problems, at least one of the two protective films in the liquid crystal display device in accordance with the present invention is a triacetyl cellulose film.

With the above invention, because the protective film of the wave plate is made from two triacetyl cellulose films, combining these two triacetyl cellulose films makes it possible to provide an appropriate protection to the wave plate. Further, because the triacetyl cellulose film used as protective film can be chosen indifferently between a triacetyl cellulose film having optical anisotropy or a triacetyl cellulose film lacking optical anisotropy, it is possible, in line with a necessity to compensate retardation, to give a suitable structure to the protective film of the front polarization plate without having to complexity the laminated structure.

In order to solve the above problems, in the liquid crystal display device in accordance with the present invention, a surface treatment film is provided on that one of the two protective films which is disposed closer to a screen front side than the wave plate.

With the above invention, because a surface treatment film is provided on that one of the two protective films which is disposed closer to a screen front side than the wave plate, it is possible to suppress light reflectivity.

In order to solve the above problems, the liquid crystal panel in the liquid crystal display device in accordance with the present invention conducts display using twisted nematic liquid crystals.

With the above invention, because the liquid crystal panel conducts display using twisted nematic liquid crystals, the polarization direction of light outputted from the front polarization plate becomes inclined at an angle of 135° counterclockwise. Accordingly, using the liquid crystal display device as in-vehicle display is especially adapted both for a driver, who wears polarized sunglasses in many cases to allow for safer driving, and for a passenger seated in a left-side seat, that is in a position where the transmitting axis of the polarized sunglasses is likely to be perpendicular to linearly polarized light reaching from the liquid crystal screen when the passenger's head in inclined. Accordingly, the liquid crystal display device in accordance with the present invention is extremely well adapted for displays in left-hand drive vehicles.

In order to solve the above problems, the liquid crystal display device in accordance with the present invention sends polarized light to viewpoints located at 30° azimuthal direction and within a polar angle range from −5° to +15° from a front direction, the polarized light having an ellipticity of 40% or greater.

With the above invention, it is possible to provide a retardation of about 140 nm in a usual viewing range, that is close to an angle of 30°.

A fuller understanding of the other objectives, characteristics and merits of the present invention can be obtained through the ensuing description. Further, the advantages of the present invention will become obvious by referring to the following description taken in conjunction with the accompanying drawings.

REFERENCE SIGNS LIST

1 Rear polarization plate (linear polarization plate)
2 Liquid crystal panel
3 Front polarization plate (linear polarization plate)
4 Optical anisotropic film (triacetyl cellulose film having biaxial optical anisotropy; wave plate)
5 Surface treatment film
11 TAC film (protective film, triacetyl cellulose film)
12 Viewing angle widening film
16 Viewing angle widening film
17 TAC film (protective film, triacetyl cellulose film)
18 Protective film
41 TAC film (triacetyl cellulose film having biaxial optical anisotropy)
42 Wave plate
20 Liquid crystal display device

DESCRIPTION OF EMBODIMENTS

An embodiment of the present invention is explained below with reference to FIG. 1 or 4, 8 and 9.

Figure 1:
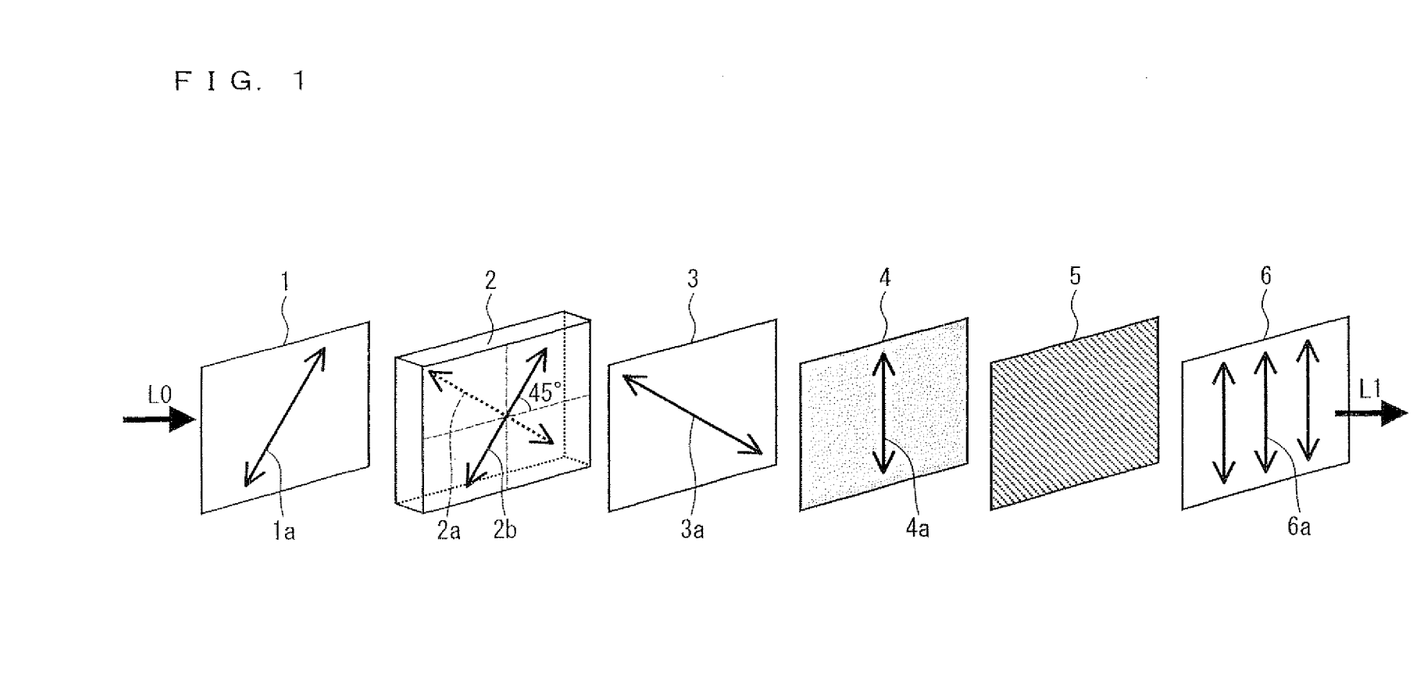
FIG. 1 is an exploded perspective view illustrating a laminated structure in accordance with an embodiment of the present invention of a liquid crystal display device.

FIG. 1 illustrates a configuration of a liquid crystal display device in accordance with the present embodiment.

The liquid crystal display device includes a rear polarization plate 1, a liquid crystal panel 2, a front polarization plate 3, an optical anisotropic film 4, and a surface treatment film 5.

The rear polarization plate 1 is a linear polarization plate disposed so that a transmission axis 1a thereof forms an angle of 45° counterclockwise with an horizontal axis of the liquid crystal panel 2. In the present embodiment, the liquid crystal panel 2 includes a TN liquid crystal cell. An alignment axis 2a on the rear side of the liquid crystal layer is perpendicular to the transmission axis of the rear polarization plate 1, and an alignment axis 2b on the front side of the liquid crystal layer is perpendicular to the alignment axis 2a. The front polarization plate 3 is a linear polarization plate, and is disposed so that a transmission axis 3a forms an angle of 135° counterclockwise with an horizontal axis of the liquid crystal panel 2 and so as to have a crossed Nichols relationship with the rear polarizing plate 1.

The optical anisotropic film 4 is a film providing retardation to transmitted light by using its optical anisiotropy and refractive anisiotropy. The optical anisotropic film 4 gives a retardation of about 140 nm to light outputted in the direction of the viewpoints Q1 and Q2 of the liquid crystal display device previously explained with reference to the above-mentioned FIG. 7; in other words, the optical anisotropic film 4 provides a 90° phase difference between polarized light components of light having a 560 nm wavelength. The optical anisotropic film 4 has a lateral slow axis 4a. The lateral slow axis 4a is disposed so as to form a 45° angle with the transmission axis 3a of the front polarization plate 3. The surface treatment film 5 includes a low reflection layer or the like.

The following is an explanation of a state of polarized light in the liquid crystal display device in accordance with the above configuration.

Backlight light L0 is changed into linearly polarized light by the rear polarized light 1 and is inputted into the liquid crystal panel 2. The liquid crystal panel 2 is normally white. Thus, in a state where no voltage is applied across the liquid crystal layer, the linearly polarized light entered the liquid crystal layer is turned 90° by optical rotation, so that the linearly polarized light passes through the front polarization plate 3 and becomes display light. Further, in a state where a voltage is applied across the liquid crystal layer, the linearly polarized light passes as it is through the liquid crystal layer, so that the linearly polarized light is absorbed by the polarization plate 3, and the liquid crystal panel 2 enters a state of black display. The light which passes the front polarization plate 3 is inputted into the optical anisotropic film 4 and is subjected to retardation as follows. Traveling toward the normal direction to the panel plane, the light which passes the front polarization plate 3 is subjected to retardation of the z-axis direction (thickness direction), i.e. of the normal direction, while when traveling toward other directions of azimuth angle and polar angle with respect to the panel, the light which passes the front polarization plate 3 is subjected to retardation varying depending on which direction the light travels, the retardation varying due to optical anisotropy and dependency on visual direction of optical path length. Especially, in a direction of a polar angle range from a frontal direction (for example a range from −5° to +15°) at an azimuth angle of 30°, which is the direction of viewpoints Q1 and Q2 in FIG. 7, a retardation of about 140 nm is provided to the light traveling in this direction, so that the light reaching the observer becomes substantially circularly polarized light.

Accordingly, in a situation where the screen is viewed from a side angle viewpoint, such as a situation where an in-vehicle display is observed by people on board on the vehicle, the reaching light passes through the polarized sunglasses 6 (as L1 in FIG. 1) without being affected by the angle of inclination of the observer's head which determinates a transmission axis 6a of the polarized sunglasses 6, and the observer is able to perceive the display with a constant and stabilized quality, even if the observer wears the polarized sunglasses 6.

Further, because observing the panel from the front while inclining one's head is uncommon, an observer wearing the polarized sunglasses 6 is unlikely to experience any discomfort caused by perceiving variations in display quality, even if the thickness retardation of the optical anisotropic film 4 is within the above range.

With the above, it is possible to provide a liquid crystal display device allowing an observer wearing polarized sunglasses to perceive, with a high display quality, an image on a screen not only from a frontal viewpoint but also if an azimuth angle and a polar angle at which viewpoints are set are shifted from the frontal viewpoint. Because a polarization direction of light outputted from the front polarization plate is usually inclined at an angle of 135° counterclockwise due to TN liquid crystal cells being used, the use of such a liquid crystal display device in accordance with the present embodiment as in-vehicle display is especially adapted for a person seated in a left-side seat, that is in a position where the transmitting angle of the polarized sunglasses is likely to be perpendicular to linear light reaching from the liquid crystal screen when the person's head is inclined, especially for a driver seated in the left-side seat, who wears polarized sunglasses in many cases to allow for safer driving. Accordingly, the liquid crystal display device in accordance with the present invention is remarkably applicable as displays in left-hand drive vehicles.

Next is an explanation, including examples of the optical anisotropic film 4, of an embodiment of the liquid crystal display device.

Embodiment 1

Figure 2:
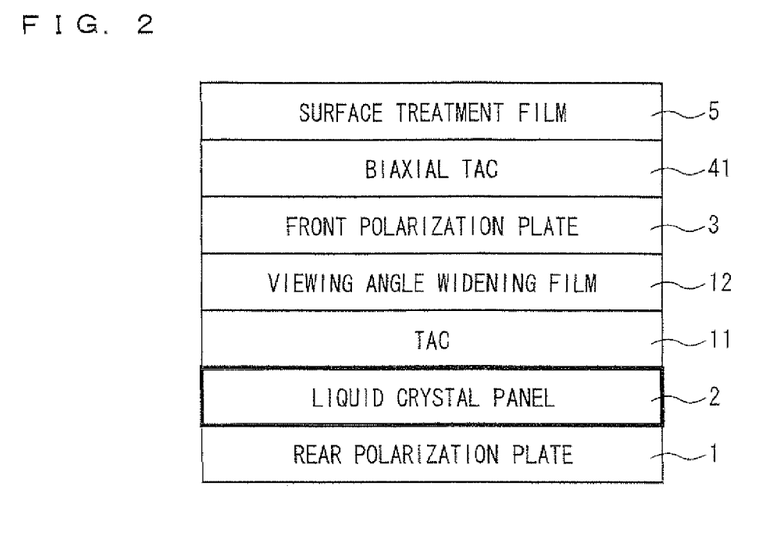
FIG. 2 is a cross section of a structure in accordance with a first embodiment of the liquid crystal display device illustrated in FIG. 1.

FIG. 2 illustrates a laminated structure of the liquid crystal display device in which the optical anisotropic film 4 is a TAC (triacetyl cellulose) film 41 having biaxial optical anisotropy.

In the liquid crystal display device, a rear polarization plate 1, a liquid crystal panel 2, a TAC film 11, a viewing angle widening film 12, a front polarizing plate 3, a TAC film 41, and a surface treatment film 5 are stacked in this order.

The TAC film 41, has a refractive anisotropy in which a principal refractive index nz of the z-axis direction (thickness direction) is different from a principal refractive index nx in the direction of planar x axis and a principal refractive index ny in the direction of planar y axis. Further, the principal refractive index nx and the principal refractive index ny differ from one another, and an axis corresponding to the higher one of the principal refractive index nx and the principal refractive index ny corresponds to the lateral slow axis 4a in FIG. 1. Further, a planar retardation of the TAC film 41 is set to a range of 70 nm±30 nm, i.e. from 40 nm to 100 nm. The lateral planar retardation of the TAC film 41 is smaller than the retardation providing a 90° phase difference in the normal direction to the panel plane. With this arrangement, light outputted in the panel front direction from the liquid crystal panel 2 in transmitting mode via the front polarization plate 3 receives retardation in the above range. Further, by three-dimensional refractive anisotropy, a retardation of about 140 nm can be given to light outputted at an azimuth angle of 30° and at a polar angle range used as usual viewing range in accordance with the azimuth angle of 30°. In order to ensure a satisfying display quality in such viewing direction, the range of ±30 nm is obtained by setting an ellipticity coefficient of polarized light in the direction of the 30° azimuth angle to 40% or above. In actual production, the TAC film 41 may have such a thickness that allows the TAC film 41 to effect a retardation close to 140 nm in the viewpoint direction.

Further, because the liquid crystal display device in accordance with the present embodiment includes the viewing angle widening film 12, between the liquid panel 2 and the TAC film 41, the light is given a wider viewing angle by retardation and optical activity compensation by the viewing angle widening film 12, and then the retardation of the light is adjusted appropriately in the right and left directions by the TAC film 41. When using liquid crystal cells in TN mode, light is liable to leak out at side angles due to residual retardation when a screen is in a black display state. However, because the black display state is almost idealized due to the compensation of birefringent anisotropy by the viewing angle widening film 12, it is possible to increase contrast for viewing the screen from a side angle. A WV film (i.e. a film in which a discotic liquid crystal layer is provided on a TAC film) may for example be used as a viewing angle widening film 12. Such a WV film can compensate optical activity, in addition to birefringence. Further, a uniaxially oriented PC film (polycarbonate film), a uniaxially oriented PVA film (polyvinylalcohol film) or the like may also be used as a viewing angle widening film 12. Using the viewing angle widening film 12 makes it possible to allow an observer wearing polarized sunglasses 6 to enjoy the benefit of the viewing angle widening effect of the panel, like an observer without the polarized sunglasses 6.

Further, the TAC film 11 may or may not have an optical anisotropy. The front polarization plate 3 is supported between the TAC film 41 (located closer to a screen front side) located further from the panel 2 and the TAC film 11 (located further from the screen front side), the TAC film 41 and the TAC film 11 both serving as protective films for the front polarization plate 3. Accordingly, because the TAC film 41, which is used in order to compensate retardation, is also used as protective film for the front polarization plate 3, the front polarization plate 3 is supported between two protective films, as in conventional technology. As a result, because it is possible to increase a strength, a resistance to humidity and a resistance to temperature of the front polarization plate 3, it is possible to give stabilized features to the front polarization plate 3. Further, because the TAC film 41 also serves as protective film, it is possible to reduce a number of components serving as protective films.

Further, because the protective film of the front polarization plate 3 is made from two TAC films, combining these two TAC films makes it possible to provide an appropriate protection to the front polarization plate 3. Further, because the TAC film 11 serving as the protective film located closer to a screen front side so as to protect the front polarization plate 3 can be a TAC film 11 having optical anisotropy or a TAC film 11 lacking optical anisotropy, it is possible, in line with a necessity to compensate retardation, to give a suitable structure to the protective film, without losing the simplicity of the laminated structure. In case where a TAC film 11 with optical anisotropy is used, the TAC film 11 is formed to have a thickness that provides an intended retardation. Further, in case where the protective film disposed further from the screen front side the front polarization plate 3 has no optical anisotropy, the protective film may be made from a material such as PET (polyethylene teraphthalate). The TAC film 11 may be omitted.

Further, with the liquid crystal display device in accordance with the present embodiment, the surface treatment film 5 on the TAC film 41 suppresses light reflection. The surface treatment film 5 may be a conventional antiglare film or an AR film, for example.

Further, in this embodiment, the rear polarization plate 1 has TAC films at its upper and lower portion; however, they are omitted from the related drawings for the sake of simple illustration.

Embodiment 2

Figure 3:
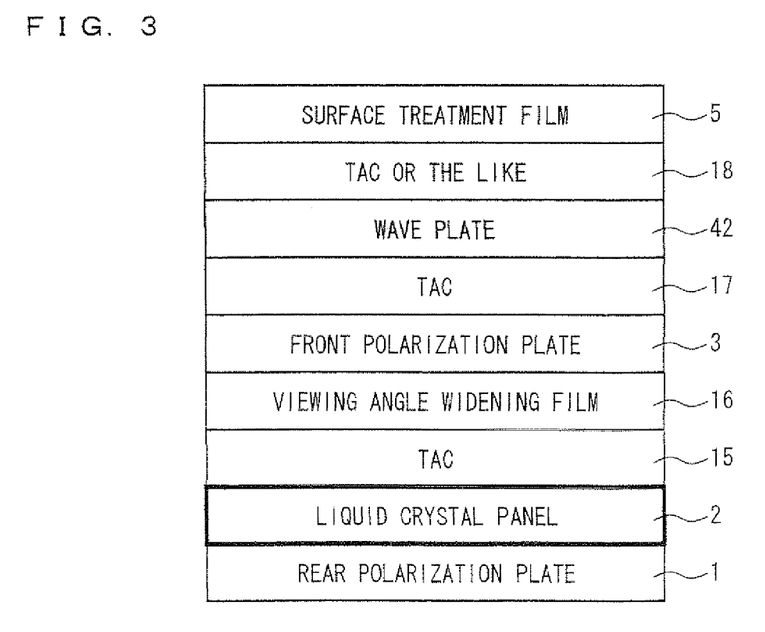
FIG. 3 is a cross section of a structure in accordance with a second embodiment of the liquid crystal display device illustrated in FIG. 1.

FIG. 3 illustrates a laminated structure of the liquid crystal display device in which the optical anisotropic film 4 is a wave plate 42 having uniaxial optical anisotropy.

In the liquid crystal display device, a rear polarization plate 1, a liquid crystal panel 2, a TAC film 15, a viewing angle widening film 16, a front polarizing plate 3, a TAC film 17, a wave plate 42, a protective film 18, and a surface treatment film 5 are stacked in this order.

The wave plate 42 has a refractive anisotropy in which a principal refractive index nz of the z-axis direction (thickness direction) is equal to one of a principal refractive index nx in the direction of planar x axis and a principal refractive index ny in the direction of planar y axis. Further, the principal refractive index nx and the principal refractive index ny differ from one another, and an axis corresponding to the higher one of the principal refractive index nx and the principal refractive index ny corresponds to the lateral slow axis 4a in FIG. 1. Further, a planar retardation of the wave plate 42 is set to a range of 60 nm±30 nm, i.e. from 30 nm to 90 nm. The planar retardation of the wave plate 42 is smaller than the retardation providing a 90° phase difference in the normal direction to the panel plane. With this arrangement, light outputted in the normal direction to the panel plane from the liquid crystal panel 2 in transmitting mode via the front polarization plate 3 receives a retardation of about twice an amount of the retardation in the above range. Further, depending on dependency on visual direction of optical path length, a retardation of about 140 nm can be given to light outputted at an azimuth angle of 30° and at a polar angle range used as usual viewing range in accordance with the azimuth angle of 30°. In order to ensure a satisfying display quality in such viewing direction, the range of ±30 nm is obtained by setting an ellipticity coefficient of polarized light in the direction of the 30° azimuth angle to 40% or above. In actual production, the wave plate 42 may have such a thickness that allows the wave plate 42 to have a retardation close to 140 nm in the viewpoint direction. The wave plate 42 may be a uniaxially oriented PC film (polycarbonate film), a uniaxially oriented PVA film (polyvinylalcohol film) or the like.

Further, because the liquid crystal display device in accordance with the present embodiment includes the viewing angle widening film 16, which is disposed further from the screen front side than the wave plate 42, the light is given a wider viewing angle by optical activity compensation by the viewing angle widening film 16, and then the retardation of the light is adjusted appropriately in the right and left directions by the wave plate 42. When using liquid crystal cells in TN mode, light is liable to leak out at side angles due to residual retardation when a screen is in a black display state. However, because the black display state is almost idealized due to the compensation of birefringent anisotropy by the viewing angle widening film 16, it is possible to increase contrast for viewing the screen at side angles. A WV film (i.e. a film in which a discotic liquid crystal layer is provided on a TAC film) may for example be used as a viewing angle widening film 16. Such a WV film can compensate optical activity, in addition to birefringence. Further, a uniaxially oriented PC film, a uniaxially oriented PVA film or the like may also be used as a viewing angle widening film 16. Using the viewing angle widening film 16 makes it possible to allow an observer wearing polarized sunglasses 6 to enjoy the benefit of the viewing angle widening effect of the panel, like an observer without the polarized sunglasses 6.

Further, the TAC films 15 and 17 may or may not have an optical anisotropy. The front polarization plate 3 is supported between the TAC film 17 (located closer to the screen front side) and the TAC film 15 (located further from the screen front side), the TAC film 17 and the TAC film 15 both serving as protective films for the front polarization plate 3. A protective film 18 protects the wave plate 42, and is made from TAC film, PET or the like. Because the TAC film 17 holds the wave plate 42 by sandwiching the wave plate 42 with the protective film 18, the TAC film 17 also serves as a protective film of the wave plate 42. Accordingly, the wave plate 42 is supported between two protective films. As a result, because it is possible to increase a strength, a resistance to humidity and a resistance to temperature of the wave plate 42, it is possible to give stabilized features to the wave plate 42. Further, because it is possible to design the TAC films 15 and/or 17 as having the function of optical compensation if necessary, it is possible, in line with a necessity to compensate retardation, to give a suitable structure to the protective film of the front polarization plate without losing the simplicity of the laminated structure. In case where the TAC films 15 and 17 with optical anisotropy are used, the TAC films 15 and 17 is formed to have a thickness or thicknesses that provides or provide an intended retardation(s). Further, in case where the TAC films 15 and 17 without optical anisotropy is used, the TAC films 15 and 17 may be made from a material such as PET (polyethylene teraphthalate). The TAC film 15 may be omitted.

Further, with the liquid crystal display device in accordance with the present embodiment, the surface treatment film 5 on the TAC film 42 suppresses light reflection. The surface treatment film 5 may be a conventional anti-glare film or an AR film may for example.

Figure 8:
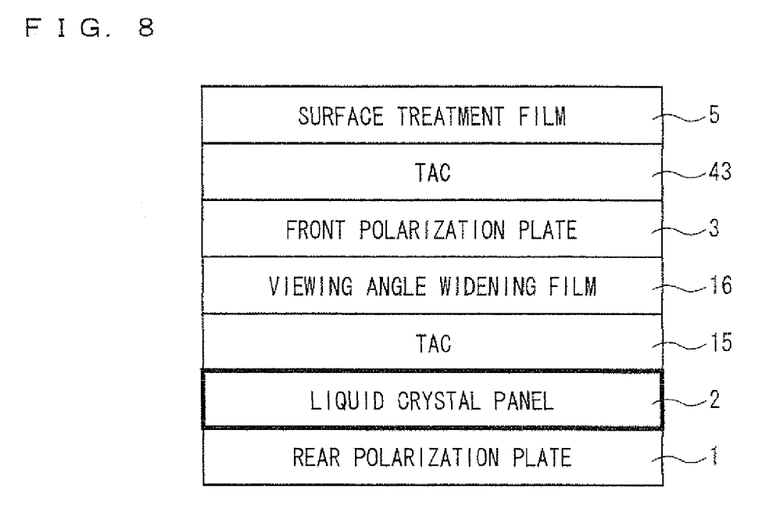
FIG. 8 is a cross section illustrating a structure of a first alternative example of the liquid crystal display device in accordance with the second embodiment.
Figure 9:
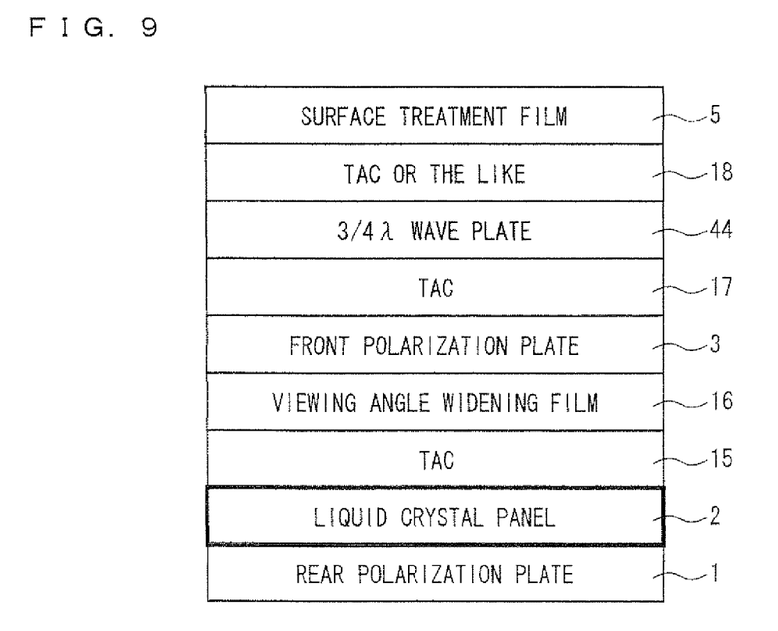
FIG. 9 is a cross section illustrating a structure of a second alternative example of the liquid crystal display device in accordance with the second embodiment.

Further, FIGS. 8 and 9 show alternative examples of configurations of the present embodiment.

FIG. 8 shows a configuration in which the rear polarization plate 1, the liquid crystal panel 2, the TAC film 15, the viewing angle widening film 16, the front polarization plate 3, a TAC film 43, and the surface treatment film 5 are stacked in this order. The TAC film 43 is uniaxial. FIG. 9 shows a configuration in which the rear polarization plate 1, the liquid crystal panel 2, the TAC film 15, the viewing angle widening film 16, the front polarization plate 3, the TAC film 17, a ¾λ wave plate 44, the protective film 18, and the surface treatment film 5 are stacked in this order. The total planar retardation may be comprised in a range from 30 nm to 90 nm in both the configuration shown on FIG. 8 and the configuration shown on FIG. 9.

This concludes the explanations regarding the various embodiments of the optical anisotropic film 4.

In the above examples, the liquid crystal panel uses TN liquid crystal cells; however, there is no restriction in this regard, and VA (vertical alignment) mode liquid crystal cells may also be used. In such a case, the transmission axis 3a of the front polarization plate 3 is usually parallel to a vertical direction in the panel plate and the transmission axis 1a of the rear polarization plate 1 is usually parallel to a horizontal direction in the panel plane. Further, an observer wearing in a standard fashion the polarized sunglasses 4, so that a direction of the transmitting angle of the polarized sunglasses 4 is the vertical direction, is able to perceive an image on the screen with a high display quality irrespective of the observer's head angle of inclination, similarly to when using TN mode.

Figure 4:
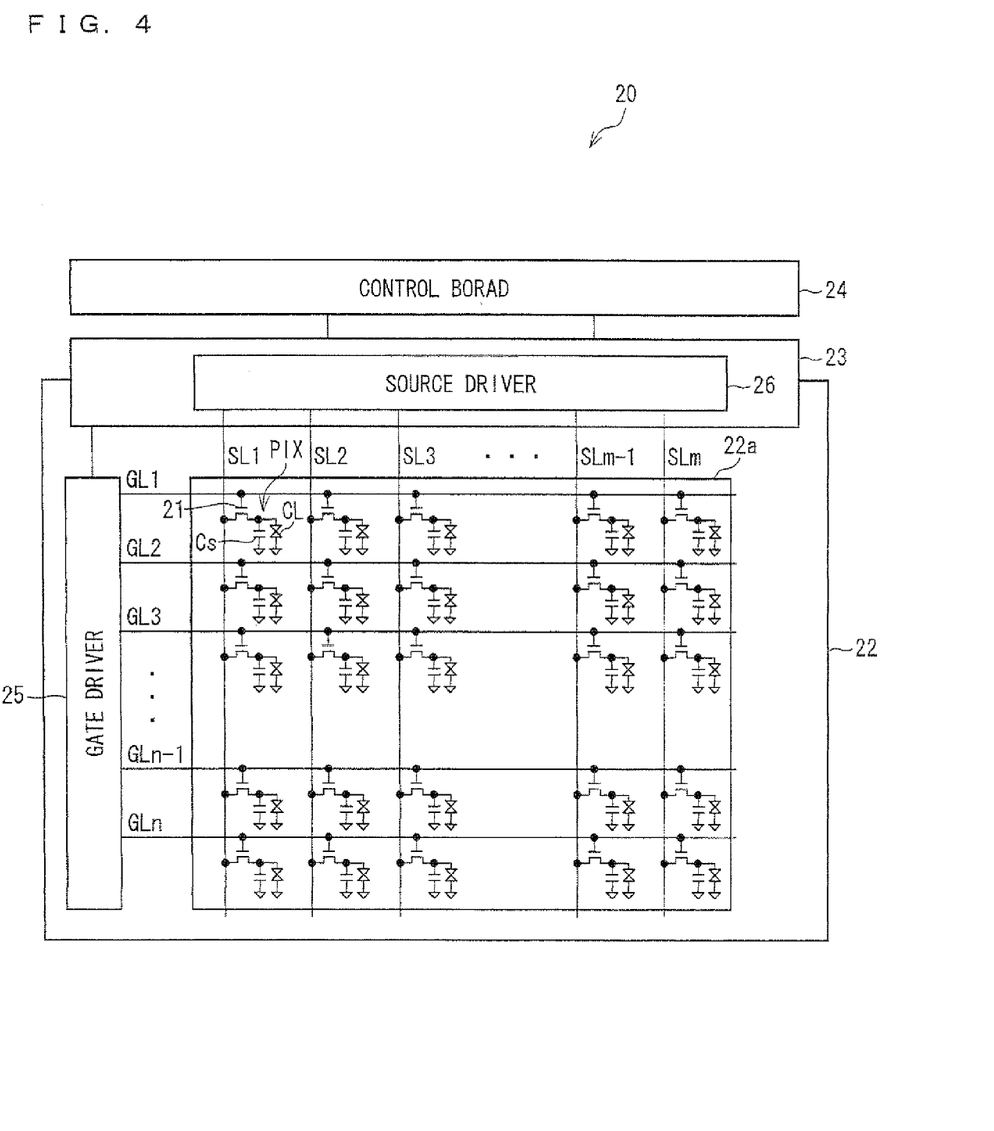
FIG. 4 is a block circuit diagram illustrating a circuit configuration of a liquid crystal panel included in the liquid crystal display device illustrated in FIG. 1.

FIG. 4 illustrates a circuit configuration of a liquid crystal display device 20, the liquid crystal display device 20 being an example of the above liquid crystal display device.

The liquid crystal display device 20 includes a liquid crystal panel 22, a flexible printed circuit board 23, and a control board 24.

The liquid crystal panel 22 corresponds to the liquid crystal panel 2 shown in FIG. 1, and is provided with a display area 22a, a plurality of gate lines (scan signal lines) GL, a plurality of source lines (data signal lines) SL, and a gate driver (scan signal line driving circuit) 25, disposed on a glass substrate and made from amorphous silicon, polycrystal silicon, CG silicon, microcrystal silicon and the like. The liquid crystal panel 22 is an active matrix display panel bonded with a facing substrate so as to sandwich the liquid crystal layer. The display area 22a is an area in which a plurality of picture elements PIX are disposed in a matrix configuration. The picture element PIX includes a TFT 21 (which is a selection element of the picture element), a liquid crystal capacitor CL, and an auxiliary capacitor Cs. The TFT 21 has a gate connected to the gate line GL, and a source connected to the source line SL. The liquid crystal capacitor CL and the auxiliary capacitor Cs are connected to a drain of the TFT 21.

The plurality of gate lines GL include gate lines GL1, GL2, GL3, . . . , GLn, each of them being connected to an output of the gate driver (scan signal line driving circuit) 25. The plurality of source lines SL include source line SL1, SL2, SL3, . . . , SLm, each of them being connected to an output of a source driver 26 which will be explained below. Further, an auxiliary capacitance lines (not shown in FIG. 4) to give an auxiliary capacitance voltage to each auxiliary capacitors Cs of the picture elements PIX . . . is formed.

The gate driver 25 is provided on the display panel 22, in an area facing the display area 22a and adjoining one extremity of a line extending in a direction of the gate lines GL. The gate driver 25 sequentially supplies gate pulses (scanning pulses) to each of the gate lines GL. The gate driver 25 uses amorphous silicon or polycrystal silicon for the display panel 12, and is manufactured so as to form a single block with the display area 22*a*. The gate driver 25 is called monolithic gate driver, gate driver free, built in gate driver in panel, gate in panel and the like.

The flexible printed circuit board 23 includes the source driver 26. The source driver 26 supplies data signals to each of the source lines SL . . . . The control board 24 is connected to the flexible printed circuit board 23, and supplies necessary signals and power to the source driver 26. The signals and power outputted from the control board 24 and supplied to the gate driver 25 pass through the flexible printed circuit board 23 and reach the gate driver 25 from the liquid crystal panel 22.

The present invention is not limited to the above-described embodiments, and various modifications are possible within the scope of the following claims. In other words, embodiments obtained by combining technical means as appropriate within the scope of the following claims are also included within the technical scope of the present invention.

INDUSTRIAL APPLICABILITY

The present invention is advantageously applicable to displays frequently looked at from a right or left direction, such as in-vehicle devices, and in particular to displays in left-handle vehicles in case TN liquid crystal particles are optically levorotatory.

The invention claimed is:

1. A liquid crystal display device comprising:
    a liquid crystal panel disposed between two linear polarization plates; and
    a triacetyl cellulose film having biaxial optical anisotropy, the triacetyl cellulose film (i) being disposed at an observer side of a front polarization plate, and (ii) having a planar retardation in a range from 40 nm to 100 nm, and wherein the front polarization plate is one of the two linear polarization plates, and
    the triacetyl cellulose film having a lateral slow axis that is inclined by substantially 45 degrees with respect to a transmission axis of the front polarization plate.

2. The liquid crystal display device according to claim 1, comprising a viewing angle widening film disposed so that the front polarization plate is located between the triacetyl cellulose film and the viewing angle widening film.

3. The liquid crystal display device according to claim 1, wherein the front polarization plate is supported between the triacetyl cellulose film having the biaxial optical anisotropy and a protective film.

4. The liquid crystal display device according to claim 3, wherein the protective film is a triacetyl cellulose film.

5. The liquid crystal display device according to claim 1, wherein a surface treatment film is provided on the triacetyl cellulose film having the biaxial optical anisotropy.

6. The liquid crystal display device according to claim 1, wherein the liquid crystal panel conducts display using twisted nematic liquid crystals.

7. The liquid crystal display device according to claim 1, wherein the liquid crystal display device emits elliptic polarized light to a viewpoint,
    the viewpoint being located in a horizontal 30° direction with respect to a direction perpendicular to a screen of the liquid crystal display device;
    at the viewpoint an ellipticity of the elliptic polarized light is 0.4 or greater.

* * * * *